United States Patent Office 2,838,423
Patented June 10, 1958

2,838,423

AMIDOMETHYL QUATERNARY AMMONIUM SILOXANES AND A METHOD OF RENDERING FABRICS WATER REPELLENT THEREWITH

John W. Gilkey, Midland, Mich., assignor to Dow Corning Corporation, Midland, Mich., a corporation of Michigan No Drawing. Application May 29, 1957
Serial No. 662,346

8 Claims. (Cl. 117—135.5)

This invention relates to novel siloxanes especially designed for use on fabrics.

The use of organopolysiloxanes for treating textiles in order to impart such desirable properties as water repellency, improved handling and improved wearing properties is well known. These materials have met with considerable commercial success. The organopolysiloxanes are particularly good for treating synthetic fibers and wool. They will also render cellulosic fibers water repellent. However, when the organopolysiloxanes heretofore known are applied to cellulosic fabrics, the siloxane coating is not durable to laundering especially when the wash water is at 160° F. Generally the spray rating [1] of a cellulosic fabric treated with the heretofore employed siloxane would drop to zero after one or two such washings. As a result, siloxanes have not been widely employed for use on cotton. Since cotton is the most widely used fiber in the manufacture of garments, there has long been a need for the development of an organopolysiloxane which when applied to cotton fabric would be resistant to laundering. The organosiloxanes of this invention accomplish this result.

It is the object of this invention to provide novel polysiloxanes which are resistant to laundering when applied to cellulosic fabrics. Another object is to provide organopolysiloxanes which will serve as fixing agents for conventional organopolysiloxanes on textiles. Another object is to provide a new water repellent treatment for textile fabrics. Other objects and advantages will be apparent from the following description.

This invention relates to quaternary amidomethyl siloxanes having the unit formula

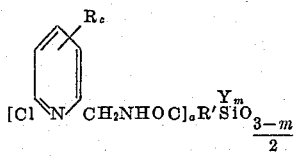

in which R is an aliphatic hydrocarbon radical of less than 4 carbon atoms, $c$ has a value from 0 to 3 inclusive, $a$ is an integer from 1 to 2 inclusive, R' is a divalent or trivalent saturated aliphatic or cycloaliphatic hydrocarbon radical of at least 2 carbon atoms, Y is a monovalent hydrocarbon radical or a fluorinated hydrocarbon radical and $m$ has a value from 0 to 2 inclusive.

The siloxanes of this invention are quaternary chlorides in which the quaternary complex is formed from pyridine or an alkylated or alkenylated pyridine such as picoline, trimethylpyridine, ethylpyridine, allylpyridine and the

[1] A spray rating of 100 indicates the fabric is completely water repellent. A spray rating of 50 indicates that the surface of the fabric is completely wet but no water soaks through. A spray rating of 0 indicates that water instantly soaks through the fabric.

like. These compositions are prepared by reacting a siloxane amide of the formula

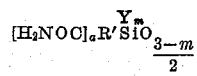

in which $a$, R', Y and $m$ are as above defined, with the hydrochloride of pyridine (or a substituted pyridine) and formaldehyde. Generally the reaction is best carried out in the presence of pyridine or the derivative of pyridine which corresponds to the hydrochloride reactant. Thus pyridine is a good solvent for the reaction with pyridine hydrochloride and picoline is a good solvent for reaction with picoline hydrochloride, etc. The preferred method involves dissolving the siloxane amide in the pyridine solvent and thereafter adding para-formaldehyde and the desired hydrochloride and then heating the mixture at reflux for 2 to 6 hours. The solvent is then removed and the resulting quaternary amidomethyl compound is obtained as a viscous, water-soluble material.

If desired, this reaction can be carried out employing other solvents such as toluene, benzene and the like.

The amide siloxanes which are employed in this invention can be prepared by any of the methods known in the art such as the methods described in the copending application of Leo H. Sommer, Serial No. 522,825, filed July 18, 1955. Alternatively, the amides can be prepared starting with the siloxane acids or the siloxane acid esters corresponding to the amides supra. An excellent method is that involving starting with the esters of the acids and bombing these esters with anhydrous ammonia to form the amide. Esters which are suitable for preparing the compositions of this invention are fully described in U. S. Patent 2,723,987 and in the copending application of Leo H. Sommer, Serial No. 522,826, filed July 18, 1955. Any of the esters or amides described in said patent and in the copending applications of Leo H. Sommer can be employed as starting materials in the preparation of the compounds of this invention. If desired, siloxane esters containing two or more different copolymerized siloxane esters can be employed. This produces siloxanes having two or more different quaternary amidomethyl groups and/or two or more different Y groups in the molecule.

For the purpose of this invention R can be methyl, ethyl, propyl, vinyl or allyl.

R' can be any divalent saturated aliphatic hydrocarbon radical of at least 2 carbon atoms such as ethylene, propylene, butylene, or octadecylene or any trivalent saturated hydrocarbon radical of at least 2 carbon atoms such as

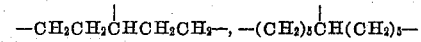

and

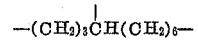

or any cyclic divalent aliphatic hydrocarbon radical such as cyclohexylene, cyclopentylene, methylcyclohexylene and

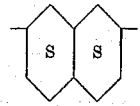

and any trivalent cycloaliphatic saturated hydrocarbon radical such as

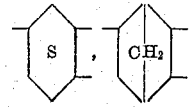

and

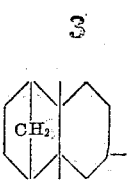

For the purpose of this invention Y can be any monovalent hydrocarbon radical such as alkyl radicals such as methyl, ethyl, butyl and octadecyl; alkenyl radicals such as vinyl, allyl and hexenyl; cycloaliphatic hydrocarbon radicals such as cyclopentyl, cyclohexyl and cyclohexenyl; alkaryl hydrocarbon radicals such as benzyl, β-phenylethyl and aryl hydrocarbon radicals such as phenyl, tolyl, xenyl and naphthyl. Y can also be any fluorinated hydrocarbon radical such as trifluorovinyl, tetrafluoroethyl, 3,3,3 - trifluoropropyl, α,α,α-trifluoromethylphenyl, $C_7F_{15}CH_2CH_2$— and decafluorocyclohexyl.

In those cases where Y contains aliphatic or cycloaliphatic unsaturation the compounds are best prepared by first adding an unsaturated ester such as methyl methacrylate to trichlorosilane and thereafter reacting the resulting chlorosilane with a Grignard reagent of the corresponding unsaturated hydrocarbon, for example vinyl Grignard. When Y contains no aliphatic or cycloaliphatic unsaturation, the compounds are best prepared by first adding the unsaturated esters to silanes of the formula $Y_mSiHCl_{3-m}$.

This invention also relates to copolymers of from .1 to 99.9 mol percent siloxanes of the unit formula

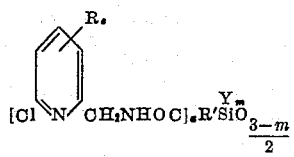

in which R, c, a, R′, Y and m are as above defined and from .1 to 99.9 mol percent siloxanes of the unit formula

in which Z is a monovalent hydrocarbon radical or a fluorinated monovalent hydrocarbon radical and b has an average value from 1 to 3 inclusive.

Thus it can be seen that the amidomethyl siloxanes of this invention can be copolymerized with any siloxane in which the substituents are monovalent hydrocarbon radicals or fluorinated monovalent hydrocarbon radicals. Specific examples of such siloxanes are dimethylsiloxane, ethylmethylsiloxane, octadecylmethylsiloxane, divinylsiloxane, allylmethylsiloxane, hexenylmethylsiloxane, monoethylsiloxane, diphenylsiloxane, dibutylsiloxane, diphenylmethylsiloxane, monophenylsiloxane, xenylmethylsiloxane, naphthylmethylsiloxane,

trifluorovinylmethylsiloxane, 1,1,1 - trifluoropropylsiloxane

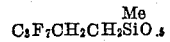

octafluorocyclopentylmethylsiloxane, bis-trifluoropropylsiloxane, α,α,α-trifluorotolylsiloxane and monooctadecylsiloxane. The copolymers can contain one or more different kinds of

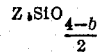

units and can contain some $SiO_2$ units.

The copolymers of this invention are best prepared by cohydrolyzing a chlorosilane of the formula

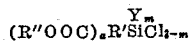

in which R″ is an alkyl radical with chlorosilanes of the formula $Z_bSiCl_{4-b}$. The corresponding copolymer containing the ester groups is then bombed with ammonia to produce the corresponding amide copolymer which is subsequently reacted with formaldehyde and the desired pyridinium hydrochloride in the presence of a solvent as above described.

It has been found that all of the compositions within the scope of this invention are useful in rendering fabrics water repellent. However, the way in which the materials are employed for such use depends upon their composition. Those compositions in which all of the silicon atoms have a quaternary amidomethyl chloride group attached thereto are useful as fixing agents for conventional siloxane water repellents. That is, the amidomethyl siloxane is mixed with a conventional siloxane and the mixture is employed to treat the fabric. The fabric is then rendered water repellent and the water repellency is durable to laundering. This procedure is more fully described in the copending application of John W. Gilkey and Richard W. Alsgaard, Serial No. 662,336, filed concurrently herewith. This is also true of the copolymers of amidomethyl compounds of this invention and siloxanes of the formula

supra in which the latter siloxane is present in amount of less than 10 mol percent. If, however, these latter siloxanes are present in amount above 10 mol percent, that is from 10 to 99.9 mol percent, then the copolymers are themselves useful for rendering textiles water repellent. The treatment so applied is durable to laundering.

Those copolymers which contain at least 10 mol percent of the

siloxanes can be applied to the fabric in any desired manner. If the amount of amidomethyl siloxane is at least 30 mol percent, the copolymers are usually soluble in water. Consequently, they can be applied to the fabric from an aqueous solution. If the amount of amidomethyl siloxane is less than 30 mol percent, the copolymers are usually not soluble in water and are best applied either in the form of an aqueous emulsion or an organic solvent solution. For best results the fabric should retain from 5 to 10% by weight of the siloxane although more or less can be retained if desired.

In any case, after applying the copolymers to the fabric the fabric is then heated generally for 1 to 10 minutes at a suitable temperature in order to dry the fabric and to cure the siloxane. Under these conditions a durable water repellent finish is obtained.

The siloxanes can be applied to any fabrics such as cotton, viscose, acetate, nylon, polyacrylonitrile fabrics, polyester fabrics, paper, leather, linen and silk.

In the specification and claims certain hydrocarbon radicals are designated by the abbreviations employed in Chemical Abstracts such as Me for methyl, Vi for vinyl, Ph for phenyl, Bu for butyl, etc.

The following examples are illustrative only and should not be construed as limiting the invention which is properly delineated in the appended claims.

*Example 1*

This example shows a typical preparation of a homopolymer within the scope of this invention.

216 g. (1 mol)

was heated in an autoclave with 3.53 mols of anhydrous ammonia at a temperature of about 161° C. for 4 hours.

The autoclave was then cooled and vented and the resulting product was the siloxane amide of the formula

$(H_2NOCCHCH_2SiO)_x$

.098 mol of this siloxane amide was dissolved in pyridine and .1 mol (3 g.) of para-formaldehyde and .1 mol of pyridine hydrochloride were added. The mixture was refluxed for 4 hours. The solvent was removed by distillation and there was obtained a viscous water-soluble material having the unit formula

$-Cl^+NC_5H_5CH_2NHOCCHCH_2SiO$

Example 2

This example shows a typical preparation of a copolymer within the scope of this invention.

Methyl methacrylate was reacted with methyldichlorosilane in the conventional manner to give the silane

$MeOOCCHCH_2SiCl_2$

This chlorosilane was then cohydrolyzed in the conventional manner with dimethyldichlorosilane to give a series of copolymers having a dimethylsiloxane content of 99, 59.8 and 32.2 mol percent respectively. Each of these copolymers was then reacted with ammonia as in Example 1 to give the corresponding amide siloxane copolymer. Each copolymer was then reacted with formaldehyde and pyridine hydrochloride as shown in Example 1. After removal of the pyridine solvent the products were viscous liquids having the following composition and properties. In the table, A is the siloxane unit

$-Cl^+NC_5H_5CH_2NHOCCHCH_2SiO$

| Composition of copolymer in mol percent | Water soluble |
|---|---|
| 99 Me₂SiO <br> 1 A | No. |
| 59.8 Me₂SiO <br> 40.2 A | Yes. |
| 32.2 Me₂SiO <br> 67.8 A | Yes. |

Example 3

1 mol of

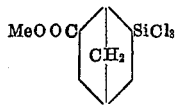

was cohydrolyzed with an excess of trimethylchlorosilane to give the fluid siloxane

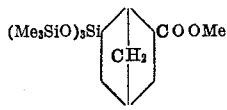

275.5 g. of this siloxane was heated in an autoclave with 140 g. of anhydrous ammonia at a temperature of 200 to 208° C. for 11 hours. The product was a brown paste which was dissolved in toluene and the solution was filtered free of sediment. The toluene was removed and the product was distilled to give the amide

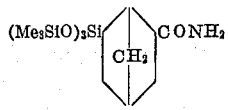

boiling at 156 to 173° C. at 1 mm.

10 g. of this amide were dissolved in 50 cc. of pyridine. 4.1 g. of pyridine hydrochloride and .9 g. of para-formaldehyde were then added and the mixture was refluxed for 7 hours. The solvent was then removed and the product was a water soluble viscous material having the formula

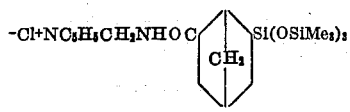

Example 4

The methyl ester of undecylenic acid was added to methyldichlorosilane and the resulting product was hydrolyzed to give the siloxane

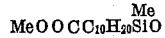
$MeOOCC_{10}H_{20}SiO$ 68 g. of this siloxane were heated in an autoclave with 60 g. of anhydrous ammonia for 4 hours at 150 to 178° C. 64 g. of the resulting siloxane amide were dissolved in pyridine and refluxed with 9 g. of para-formaldehyde and 34.7 g. of pyridine hydrochloride for 11 hours. The product was decanted and the solvent removed to give a dark brown viscous product which was water soluble and had the unit formula

$-Cl^+NC_5H_5CH_2NHOCC_{10}H_{20}SiO$

Example 5

108 g. of

$MeOOCCHCH_2SiCl_2$ and 106 g. of

$CF_3CH_2CH_2SiCl_2$ were cohydrolyzed. 130 g. of this copolymer were heated with 35 g. of anhydrous ammonia in an autoclave for 4 hours at 200 to 220° C. 36.1 g. of the resulting siloxane amide copolymer were dissolved in 500 cc. of pyridine and refluxed for 7 hours with 5.7 g. of para-formaldehyde and 22 g. of pyridine hydrochloride. The pyridine was removed and there was obtained a viscous water-soluble product which was a copolymer of

$-Cl^+NC_5H_5CH_2NHOCCHCH_2SiO$ and $CF_3CH_2CH_2SiO$

Example 6

This example shows the effectiveness of the water-soluble copolymers of this invention for rendering textiles water repellent.

A copolymer of 32.2 mol percent Me₂SiO and 67.8 mol percent

$-Cl^+NC_5H_5CH_2NHOCCHCH_2SiO$ was prepared in accordance with the procedure of Example 2. 3 g. of this material were dissolved in 41 g. of water. Cotton fabric was dipped into the solution and thereafter squeezed dry and heated 90 seconds at 350° F. The resulting fabric had a spray rating of 100. The fabric was then laundered 5 times during which the wash water was 160° F. After the fifth laundering the spray rating was 70.

By contrast with a conventional commercial siloxane water repellent the spray rating drops to 0 after one laundering at 160° F.

Example 7

This example shows the utility of a copolymer of this invention for rendering textiles water repellent when applied from organic solvent solution.

A copolymer of 64.8 mol percent dimethylsiloxane and 35.2 mol percent

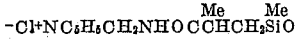
$-Cl^+NC_5H_5CH_2NHOCCHCH_2SiO$ was prepared in accordance with the procedure of Example 2. 2 g. of this copolymer were dissolved in a mixture of 35 g. of ethanol and 67 g. of perchloroethylene. Cotton fabric was dipped into the solution and squeezed dry. The fabric was then heated 10 minutes at 300° F. The spray rating was 70 and after laundering at 160° F. the spray rating was 50.

*Example 8*

When alpha-picoline hydrochloride is reacted in picoline solution in the process of Example 1, the siloxane having the unit formula

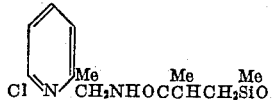

is obtained. This material is water soluble and is an effective fixing agent for siloxane water repellents on fabric.

*Example 9*

When the following siloxane esters are heated in an autoclave with ammonia and the resulting amide is heated in pyridine solution with para-formaldehyde and pyridine hydrochloride as in Example 1, the following siloxane amidomethyl compounds are obtained.

|   | Esters | Pyridinium compound |
|---|--------|---------------------|
| 1 | MeOOC⟨Ph,S,SiO⟩ | -Cl⁺NC₅H₅CH₂NHOC⟨Ph,S,SiO⟩ |
| 2 | MeOOC⟨CH₂,CH₂,Me,SiO⟩ MeOOC | -Cl⁺NC₅H₅CH₂NHOC⟨CH₂,CH₂,Me,SiO⟩ -Cl⁺NC₅H₅CH₂NHOC |
| 3 | MeOOCCH₂CHSiO (Me) MeOOCCH₂CH₂ | -Cl⁺NC₅H₅CH₂NHOCCH₂CHSiO (Me) -Cl⁺NC₅H₅CH₂NHOCCH₂CH₂ |
| 4 | MeOOCH₃₄C₁₇SiO (Ph) | -Cl⁺NC₅H₅CH₂NHOCC₁₇H₃₄SiO (Ph) |
| 5 | MeOOCCHCH₂SiO (Me,Vi) | -Cl⁺NC₅H₅CH₂NHOCCHCH₂SiO (Me,Vi) |
| 6 | [MeOOCCHCH₂Si]₂O (Me,Me₂) | [-Cl⁺NC₅H₅CH₂NHOCCHCH₂Si]₂O (Me,Me₂) |

*Example 10*

The compound C₃F₇CH₂CH₂SiHCl₂ is made by reacting C₃F₇CH₂CH₂MgCl with HSiCl₃. When this product is reacted with methylmethacrylate in the presence of chloroplatinic acid the compound $$MeOOCCHCH_2SiCH_2CH_2C_3F_7 \atop Me \quad Cl_2$$

is obtained. When this compound is hydrolyzed and then reacted in the procedure of Example 1, the siloxane

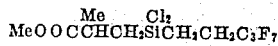

results.

*Example 11*

When vinyl pyridine hydrochloride and 2,4,6-trimethylpyridine hydrochloride are each reacted in the presence of vinyl pyridine and 2,4,6-trimethylpyridine respectively in the procedure of Example 1, the compounds

[structures shown]

and

[structures shown]

respectively are obtained.

*Example 12*

When the following siloxane ester copolymers are reacted in the procedure of Example 1, the following amidomethyl siloxanes are obtained:

| Composition of Ester Copolymer in mol percent | Composition of Amidomethyl Copolymer in mol percent |
|---|---|
| 1. 50 PhMeSiO / 25 ViMeSiO / 25 MeOOCCHCH₂SiO (Me,Me) / 10 CH₃C₆H₄SiO₁.₅ | 50 PhMeSiO / 25 ViMeSiO / 25 -Cl⁺NC₅H₅CH₂NHOCCHCH₂SiO (Me,Me) / 10 CH₃C₆H₄SiO₁.₅ |
| 2. 20 C₁₈H₃₇SiO (Me) / 10 C₆H₁₁SiO / 10 Bu₂SiO / 50 MeOOCCHCH₂SiO (Me,Me) | 20 C₁₈H₃₇SiO (Me) / 10 C₆H₁₁SiO / 10 Bu₂SiO / 50 -Cl⁺NC₅H₅CH₂NHOCCHCH₂SiO (Me,Me) |
| 3. (Me₃SiO)₂SiOSiCH₂CHCOOMe (Me₂,Me) | (Me₃SiO)₂SiOSiCH₂CHCONHCH₂C₅H₅N⁺Cl⁻ (Me₂,Me) |

That which is claimed is:

1. A siloxane having the unit formula

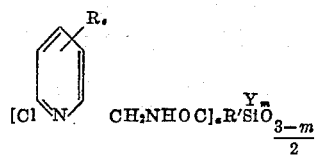

in which R is an aliphatic hydrocarbon radical of less than 4 carbon atoms, c has a value from 0 to 3 inclusive, a is an integer from 1 to 2 inclusive, R' is selected from the group consisting of divalent and trivalent saturated aliphatic and cycloaliphatic hydrocarbon radicals of at least 2 carbon atoms, Y is selected from the group consisting of monovalent hydrocarbon radicals and fluorinated monovalent hydrocarbon radicals and *m* has an average value from 0 to 2 inclusive.

2. A siloxane of the unit formula

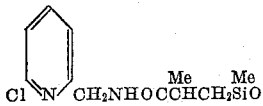

3. A copolymeric siloxane consisting essentially of from .1 to 99.9 mol percent of a siloxane of the unit formula

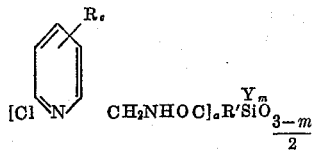

in which R is an aliphatic hydrocarbon radical of less than 4 carbon atoms, *c* has a value from 0 to 3 inclusive, *a* is an integer from 1 to 2 inclusive, R' is selected from the group consisting of divalent and trivalent saturated aliphatic and cycloaliphatic hydrocarbon radicals of at least 2 carbon atoms, Y is selected from the group consisting of monovalent hydrocarbon radicals and fluorinated monovalent hydrocarbon radicals and *m* has an average value from 0 to 2 inclusive and .1 to 99.9 mol percent siloxane units of the formula

in which Z is selected from the group consisting of monovalent hydrocarbon radicals and fluorinated monovalent hydrocarbon radicals and *b* has an average value from 1 to 3 inclusive.

4. A copolymeric siloxane consisting of from .1 to 99.9 mol percent siloxane units of the formula

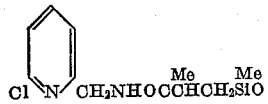

and .1 to 99.9 mol percent dimethylsiloxane units.

5. A copolymeric siloxane consisting essentially of from .1 to 90 mol percent of a siloxane of the unit formula

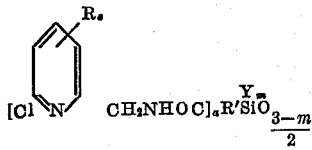

in which R is an aliphatic hydrocarbon radical of less than 4 carbon atoms, *c* has a value from 0 to 3 inclusive, *a* is an integer from 1 to 2 inclusive, R' is selected from the group consisting of divalent and trivalent saturated aliphatic and cycloaliphatic hydrocarbon radicals of at least 2 carbon atoms, Y is selected from the group consisting of monovalent hydrocarbon radicals and fluorinated monovalent hydrocarbon radicals and *m* has an average value from 0 to 2 inclusive and 10 to 99.9 mol percent siloxane units of the formula

in which Z is selected from the group consisting of monovalent hydrocarbon radicals and fluorinated monovalent hydrocarbon radicals and *b* has an average value from 1 to 3 inclusive.

6. A copolymer consisting essentially of from .1 to 90 mol percent siloxane units of the formula

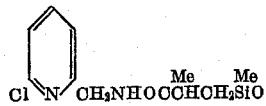

and 10 to 99.9 mol percent dimethylsiloxane.

7. A method of rendering fabrics water repellent which comprises applying to the fabric a copolymeric siloxane consisting essentially of from .1 to 90 mol percent

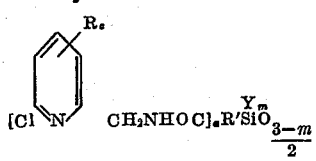

in which R is an aliphatic hydrocarbon radical of less than 4 carbon atoms, *c* has a value from 0 to 3 inclusive, *a* is an integer from 1 to 2 inclusive, R' is selected from the group consisting of divalent and trivalent saturated aliphatic and cycloaliphatic hydrocarbon radicals of at least 2 carbon atoms, Y is selected from the group consisting of monovalent hydrocarbon radicals and fluorinated monovalent hydrocarbon radicals and *m* has an average value from 0 to 2 inclusive, and from 10 to 99.9 mol percent siloxane units of the formula

in which Z is selected from the group consisting of monovalent hydrocarbon radicals and fluorinated monovalent hydrocarbon radicals and *b* has an average value from 1 to 3 inclusive and thereafter heating the treated fabric to fix the siloxane.

8. A method of rendering a fabric water repellent which comprises applying to the fabric a copolymer of from .1 to 90 mol per cent of the siloxane of the unit formula

and 10 to 99.9 mol percent dimethylsiloxane units and thereafter heating the treated fabric to fix the siloxane.

References Cited in the file of this patent

UNITED STATES PATENTS

| | | |
|---|---|---|
| 2,637,623 | Jones | May 5, 1953 |
| 2,723,987 | Speier | Nov. 15, 1955 |